(12) United States Patent
Sidders

(10) Patent No.: US 10,030,781 B2
(45) Date of Patent: Jul. 24, 2018

(54) VALVE ASSEMBLY FOR A TIRE PRESSURE MANAGEMENT SYSTEM

(71) Applicant: DANA HEAVY VEHICLE SYSTEMS GROUP, LLC, Maumee, OH (US)

(72) Inventor: Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/320,840

(22) PCT Filed: Jun. 29, 2015

(86) PCT No.: PCT/US2015/038249
§ 371 (c)(1),
(2) Date: Dec. 21, 2016

(87) PCT Pub. No.: WO2016/003866
PCT Pub. Date: Jan. 7, 2016

(65) Prior Publication Data
US 2017/0204983 A1     Jul. 20, 2017

Related U.S. Application Data

(60) Provisional application No. 62/019,079, filed on Jun. 30, 2014.

(51) Int. Cl.
*F16K 15/20* (2006.01)
*B60C 23/00* (2006.01)
(Continued)

(52) U.S. Cl.
CPC ............ *F16K 15/20* (2013.01); *B60C 23/003* (2013.01); *F16K 11/07* (2013.01); *F16K 31/426* (2013.01)

(58) Field of Classification Search
CPC ........ F16K 15/20; F16K 11/07; F16K 41/426; B60C 23/003
See application file for complete search history.

(56) References Cited

U.S. PATENT DOCUMENTS 780,986 A      1/1905  Francis
1,729,469 A    9/1929  Anderson
(Continued)

FOREIGN PATENT DOCUMENTS

CN      1130246 A    9/1996
CN    101157327 A    4/2008
(Continued)

OTHER PUBLICATIONS

International Search Report and Written Opinion for Application No. PCT/US2015/038249, dated Sep. 4, 2015.
(Continued)

*Primary Examiner* — Craig Schneider
*Assistant Examiner* — Kevin Barss
(74) *Attorney, Agent, or Firm* — Marshall & Melhorn, LLC

(57) ABSTRACT

A valve assembly for a tire pressure management system. The valve assembly including a housing. The housing includes a valve cavity. A cage member is positioned within the valve cavity. The cage member is in a sealed relationship with the housing. A piston is moveable within the cage member. A biasing member is provided in a biasing member cavity portion of the valve cavity. The biasing member contacts a stem portion of the piston to urge the piston away from the biasing member cavity portion.

20 Claims, 5 Drawing Sheets

(51) Int. Cl.
*F16K 11/07* (2006.01)
*F16K 31/42* (2006.01)

(56) References Cited

U.S. PATENT DOCUMENTS

| | | | |
|---|---|---|---|
| 2,307,949 A | 1/1943 | Phillips | |
| 2,690,757 A | 10/1954 | Orchowski | |
| 3,105,477 A | 10/1963 | Lowther | |
| 3,165,097 A | 1/1965 | Lowther | |
| 3,456,676 A | 7/1969 | Stuck | |
| 3,489,166 A | 1/1970 | Williams | |
| 3,503,417 A | 3/1970 | Toda et al. | |
| 3,593,742 A | 7/1971 | Taylor | |
| 3,647,176 A | 3/1972 | Usry | |
| 3,724,488 A | 4/1973 | Featherstone | |
| 3,747,626 A | 7/1973 | Valentino | |
| 3,789,867 A | 2/1974 | Yabor | |
| 3,838,717 A | 10/1974 | Wolf | |
| 4,075,294 A | 2/1978 | Saito et al. | |
| 4,171,119 A | 10/1979 | Lamson | |
| 4,269,223 A | 5/1981 | Carter et al. | |
| 4,428,396 A | 1/1984 | Wall | |
| 4,480,580 A | 11/1984 | Nalence | |
| 4,493,474 A | 1/1985 | Ohyama | |
| 4,520,369 A | 5/1985 | Shackleton | |
| 4,574,844 A | 3/1986 | Neff et al. | |
| 4,641,698 A | 2/1987 | Bitonti | |
| 4,744,399 A | 5/1988 | Magnuson et al. | |
| 4,765,385 A | 8/1988 | McGeachy | |
| 4,768,574 A | 9/1988 | Probst | |
| 4,823,842 A | 4/1989 | Toliusis | |
| 4,880,033 A | 11/1989 | Neff | |
| 4,895,199 A | 1/1990 | Magnuson et al. | |
| 4,922,946 A | 5/1990 | Boulicault | |
| 4,924,926 A * | 5/1990 | Schultz | B60C 23/003 137/625.2 |
| 4,969,628 A | 11/1990 | Reich et al. | |
| 5,004,008 A | 4/1991 | Drucker | |
| 5,029,604 A | 7/1991 | Spektor et al. | |
| 5,085,246 A | 2/1992 | Griinke | |
| 5,141,589 A | 8/1992 | Mittal | |
| 5,181,977 A | 1/1993 | Gneiding et al. | |
| 5,211,198 A | 5/1993 | Tinholt | |
| 5,244,027 A | 9/1993 | Freigang | |
| 5,249,609 A | 10/1993 | Walker et al. | |
| 5,253,687 A | 10/1993 | Beverly et al. | |
| 5,261,471 A | 11/1993 | Freigang et al. | |
| 5,293,919 A | 3/1994 | Olney et al. | |
| 5,309,969 A | 5/1994 | Mittal | |
| 5,313,995 A | 5/1994 | Schultz | |
| 5,327,346 A | 7/1994 | Goodell | |
| 5,398,743 A | 3/1995 | Bartos | |
| 5,409,045 A | 4/1995 | Walker et al. | |
| 5,411,051 A | 5/1995 | Olney et al. | |
| 5,413,159 A | 5/1995 | Olney et al. | |
| 5,465,772 A | 11/1995 | Sartor | |
| 5,540,268 A | 7/1996 | Mittal | |
| 5,553,647 A | 9/1996 | Jaksic | |
| 5,587,698 A | 12/1996 | Genna | |
| 5,618,361 A | 4/1997 | Colussi et al. | |
| 5,629,873 A | 5/1997 | Mittal et al. | |
| 5,629,874 A | 5/1997 | Mittal | |
| 5,647,927 A | 7/1997 | Mason | |
| 5,713,386 A | 2/1998 | Heredia Batista et al. | |
| 5,901,749 A | 5/1999 | Watson | |
| 5,970,996 A | 10/1999 | Markey et al. | |
| 6,098,682 A | 8/2000 | Kis | |
| 6,142,168 A | 11/2000 | Sumrall | |
| 6,209,350 B1 | 4/2001 | Kimble, III | |
| 6,250,327 B1 | 6/2001 | Freigang et al. | |
| 6,302,138 B1 | 10/2001 | Sumrall | |
| 6,374,852 B1 | 4/2002 | Olivas | |
| 6,409,055 B1 | 6/2002 | Officier | |
| 6,427,714 B2 | 8/2002 | Freigang et al. | |
| 6,561,017 B1 | 5/2003 | Claussen et al. | |
| 6,604,414 B1 | 8/2003 | Claussen et al. | |
| 6,634,375 B2 | 10/2003 | Olivas et al. | |
| 6,668,861 B2 | 12/2003 | Williams | |
| 6,758,088 B2 | 7/2004 | Claussen et al. | |
| 6,769,666 B2 | 8/2004 | Hall et al. | |
| 6,779,618 B2 | 8/2004 | Tarasinski | |
| 6,865,930 B1 | 3/2005 | Claussen et al. | |
| 6,868,719 B1 | 3/2005 | Claussen et al. | |
| 6,880,598 B2 | 4/2005 | Haunhorst et al. | |
| 6,894,607 B1 | 5/2005 | Claussen et al. | |
| 6,941,989 B2 | 9/2005 | Grotendorst et al. | |
| 6,943,673 B2 | 9/2005 | Skoff et al. | |
| 7,028,983 B2 | 4/2006 | Ozaki et al. | |
| 7,032,611 B1 | 4/2006 | Sheng | |
| 7,051,585 B2 | 5/2006 | Claussen et al. | |
| 7,079,047 B2 | 7/2006 | Boulot | |
| 7,140,386 B2 | 11/2006 | Avis et al. | |
| 7,188,638 B1 | 3/2007 | Peach | |
| 7,191,796 B1 | 3/2007 | Rehmert, Jr. | |
| 7,265,659 B2 | 9/2007 | Claussen et al. | |
| 7,367,371 B2 | 5/2008 | Meydieu et al. | |
| 7,437,920 B2 | 10/2008 | Beverly et al. | |
| 7,509,969 B2 | 3/2009 | Huang | |
| 7,530,379 B1 | 5/2009 | Becker et al. | |
| 7,538,661 B2 | 5/2009 | Claussen et al. | |
| 7,686,051 B2 | 3/2010 | Medley et al. | |
| 7,690,411 B2 | 4/2010 | Wilson | |
| RE41,756 E | 9/2010 | Claussen et al. | |
| 7,909,076 B2 | 3/2011 | Wilson | |
| 7,950,414 B2 | 5/2011 | Suzuki et al. | |
| 7,963,307 B2 | 6/2011 | Rudolf et al. | |
| 8,047,224 B2 | 11/2011 | Eichler | |
| 8,069,890 B2 | 12/2011 | Resare et al. | |
| 8,087,439 B2 | 1/2012 | Hobe et al. | |
| 8,113,234 B2 | 2/2012 | Campau | |
| 8,122,926 B2 | 2/2012 | Rogers | |
| 8,132,607 B2 | 3/2012 | Kusunoki et al. | |
| 8,135,561 B2 | 3/2012 | Lin et al. | |
| 8,136,561 B2 | 3/2012 | Sandoni et al. | |
| 8,245,746 B2 | 8/2012 | Stanczak | |
| 8,256,447 B2 | 9/2012 | Badstue et al. | |
| 8,307,868 B2 | 11/2012 | Medley et al. | |
| 8,307,869 B2 | 11/2012 | Medley et al. | |
| 8,344,868 B2 | 1/2013 | Browne et al. | |
| 8,353,311 B2 | 1/2013 | Rigamonti et al. | |
| 8,356,620 B2 | 1/2013 | Colussi et al. | |
| 8,479,790 B2 | 7/2013 | Resare et al. | |
| 8,479,791 B2 | 7/2013 | Schulte et al. | |
| 8,590,585 B2 | 11/2013 | Rogers | |
| 8,596,560 B2 | 12/2013 | Morgan et al. | |
| 8,813,787 B2 | 8/2014 | Matsumura et al. | |
| 8,844,596 B2 | 9/2014 | Medley et al. | |
| 9,308,788 B2 | 4/2016 | Fazekas | |
| 2002/0134428 A1 | 9/2002 | Gabelmann | |
| 2005/0121125 A1 | 6/2005 | Maquaire | |
| 2006/0180256 A1 | 8/2006 | Mittal | |
| 2007/0187015 A1 | 8/2007 | Alff | |
| 2008/0223457 A1 | 9/2008 | Kobziar et al. | |
| 2009/0032619 A1 | 2/2009 | Morgan et al. | |
| 2009/0314406 A1 | 12/2009 | Browne et al. | |
| 2009/0314407 A1 | 12/2009 | Browne et al. | |
| 2011/0175916 A1 | 7/2011 | Noris et al. | |
| 2011/0221261 A1 | 9/2011 | Eaton et al. | |
| 2011/0272618 A1 | 11/2011 | Mosler et al. | |
| 2011/0308637 A1 | 12/2011 | Tsiberidis | |
| 2011/0315235 A1 | 12/2011 | Colefax et al. | |
| 2012/0138826 A1 | 6/2012 | Morris et al. | |

FOREIGN PATENT DOCUMENTS

| | | |
|---|---|---|
| CN | 103025546 A | 4/2013 |
| DE | 102009000394 A1 | 10/2009 |
| DE | 102008062065 A1 | 6/2010 |
| DE | 102008062072 A1 | 6/2010 |
| EP | 0206949 A1 | 12/1986 |
| EP | 0358349 A1 | 3/1990 |
| EP | 1031899 A2 | 8/2000 |
| FR | 1432885 A | 3/1966 |
| FR | 2149276 A1 | 3/1973 |

(56) References Cited

FOREIGN PATENT DOCUMENTS

| | | | |
|---|---|---|---|
| FR | 2619762 | A1 | 3/1989 |
| GB | 410531 | A | 5/1934 |
| GB | 646891 | A | 11/1950 |
| GB | 1037494 | A | 7/1966 |
| GB | 1346130 | A | 2/1974 |
| GB | 2312268 | A | 10/1997 |
| JP | 2002500740 | A | 1/2002 |
| WO | 9114120 | A1 | 9/1991 |
| WO | 02062595 | A1 | 8/2002 |
| WO | 2004030952 | A1 | 4/2004 |
| WO | 2010094067 | A1 | 8/2010 |
| WO | 2011028346 | A1 | 3/2011 |

OTHER PUBLICATIONS

Machine-generated English translation of JP 2002500740, obtained via the Japanese Patent Office.

\* cited by examiner

VALVE ASSEMBLY FOR A TIRE PRESSURE MANAGEMENT SYSTEM

CROSS-REFERENCE TO RELATED APPLICATION

This application is claiming the benefit, under 35 U.S.C. 119(e), of the provisional U.S. patent application which was granted Ser. No. 62/019,079 and filed on Jun. 30, 2014, the entire disclosure of which is hereby incorporated by reference.

BACKGROUND OF THE INVENTION

The invention relates to a valve assembly. More particularly, the invention relates to a valve assembly for a tire pressure management system.

Certain types of vehicles such as, for example, tractors used for farming require that the tire pressure of their wheel assemblies be periodically adjusted for optimal performance. Generally, these types of vehicles have large volume wheel assemblies which operate over a wide range of tire pressures. It is known in the art to utilize a tire pressure management system to inflate or deflate these large volume wheel assemblies. Currently, the tire pressure range over which the known systems can operate is limited.

Therefore, it would be desirable to provide a valve assembly which expands the pressure range over which a tire pressure management system can operate.

BRIEF SUMMARY OF THE INVENTION

Embodiments of a valve assembly for a tire pressure management system are provided.

In an embodiment, the valve assembly comprises a housing. The housing comprises a valve cavity. A cage member is positioned within the valve cavity. The cage member is in a sealed relationship with the housing. A piston is moveable within the cage member. A biasing member is provided in a biasing member cavity portion of the valve cavity. The biasing member contacts a stem portion of the piston to urge the piston away from the biasing member cavity portion.

In another embodiment, the valve assembly comprises a housing. The housing comprises a valve cavity. A first fluid conduit is in fluid communication with the valve cavity and another portion of the tire pressure management system. A second fluid conduit is in fluid communication with the valve cavity and is selectively in fluid communication with the first fluid conduit. A third fluid conduit is in fluid communication with the valve cavity and is selectively in fluid communication with the first fluid conduit. A cage member is positioned within the valve cavity. The cage member is in a sealed relationship with the housing. A piston is moveable within the cage member. The piston comprises a first end surface and a second end surface. The first end surface and the second end surface define opposite ends of the piston. The first end surface is configured to receive a pneumatic signal. The second end surface is configured to be contacted by a biasing member to urge the piston away from an end of the valve cavity.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE INVENTION

Figure 1:
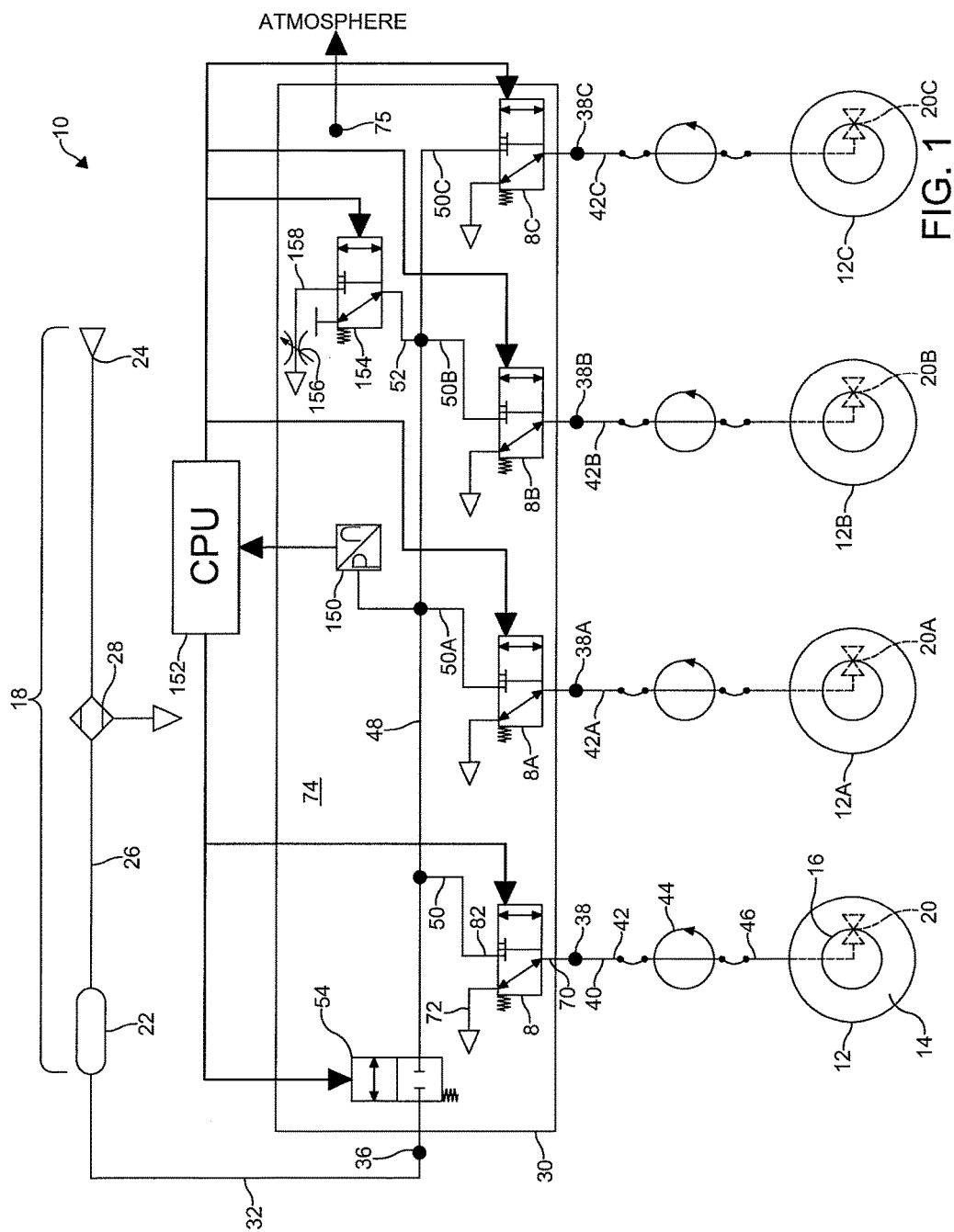
FIG. 1 is a schematic view of an embodiment of a tire pressure management system in accordance with the invention.

It is to be understood that the invention may assume various alternative orientations and step sequences, except where expressly specified to the contrary. It is also to be understood that the specific systems, methods, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A valve assembly 8 for a tire pressure management system 10 will be described herein. The valve assembly 8 is suitable for use with the embodiments of the tire pressure management system described in published PCT patent application no. WO 2014/124429, the entire disclosure of which is hereby incorporated by reference. It should be appreciated that the valve assembly 8 could be utilized in other systems which are not disclosed in published PCT patent application no. WO 2014/124429. The tire pressure management system 10 may be utilized with a vehicle (not depicted) such as, for example, a passenger, commercial or off-highway vehicle. Also, the system could have industrial, locomotive, and aerospace applications.

The tire pressure management system 10 will be described with reference primarily to FIG. 1 and primarily with reference to one valve assembly 8. However, the system 10 is not limited to include only one valve assembly 8 and may include a plurality of valve assemblies 8, 8A, 8B, 8C. It is preferred that each valve assembly 8, 8A, 8B, 8C provided is similarly configured and as described below. Also, the system 10 will be described primarily with reference to one wheel assembly 12. However, the system is not limited to use with only one wheel assembly 12 and is suitable for use with a plurality of wheel assemblies 12, 12A, 12B, 12C.

The wheel assembly 12 comprises a tire 14 and a wheel rim 16. An axle shaft (not depicted) may be coupled to the wheel assembly 12, specifically, the wheel rim 16. Preferably, each wheel assembly 12, 12A, 12B, 12C is as described above. The wheel assembly 12 is configured to house a pressurized fluid such as, for example, air. The pressure of the air housed within the wheel assembly 12 will hereinafter be referred to as "tire pressure."

The system 10 is utilized to adjust (increase, decrease or maintain) the tire pressure. In an embodiment, a target tire pressure may be selected for the wheel assembly 12. In other embodiments, the system can be practiced so that a target tire pressure is selected for one or more wheel assemblies 12, 12A, 12B, 12C. In certain embodiments, the target tire pressure may be selected to be about 100 psi or more. For example, the target tire pressure may be selected to be about 110 psi. In other embodiments, the target tire pressure may be selected to be less than 100 psi. For example, the target tire pressure may be selected to be about 40 psi. Advantageously, the system 10 allows the tire pressure to be increased or decreased to the target tire pressure. For example, the tire pressure may be increased from about 60 psi to about 110 psi or from about 10 psi to about 40 psi. In still other embodiments, the target tire pressure may be selected to be about 5 psi and decreased from about 40 psi to about 5 psi.

Pressurized air is supplied to the wheel assembly 12 from an air source 18. The air source 18 supplies air which is at a pressure that is greater than the tire pressure and the target tire pressure. The air source 18 and pressurized air supplied therefrom is utilized to open a wheel valve assembly 20 and increase the tire pressure when desired. Preferably, the air source 18 comprises a reservoir 22 such as, for example, a wet tank. A compressor 24 is in fluid communication with the reservoir 22 via a supply conduit 26 and supplies pressurized air thereto for storage therein. In certain embodiments, a drier 28 is interposed in the supply conduit 26 for removing water from the pressurized air. A filter (not depicted) may also be interposed in the supply conduit 26.

The air source 18 is in fluid communication with a pneumatic control unit 30 via an air supply conduit 32. The pneumatic control unit 30 is utilized in increasing, decreasing, maintaining and measuring the tire pressure. The pneumatic control unit 30 is also utilized in venting the system 10.

Figure 2:
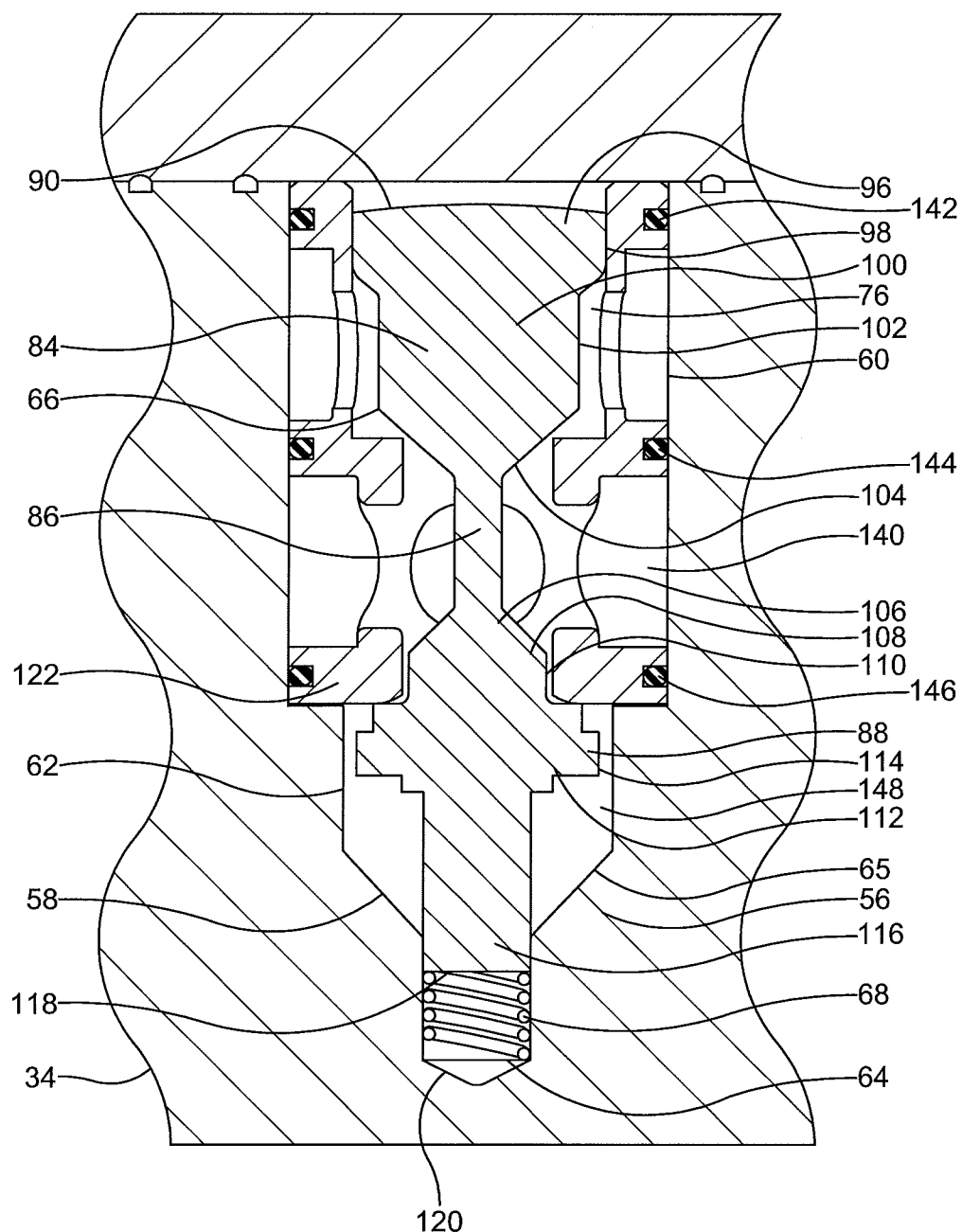
FIG. 2 is a cross-sectional view of a portion of an embodiment of a valve assembly of the tire pressure management system of FIG. 1 in accordance with the invention.
Figure 3:
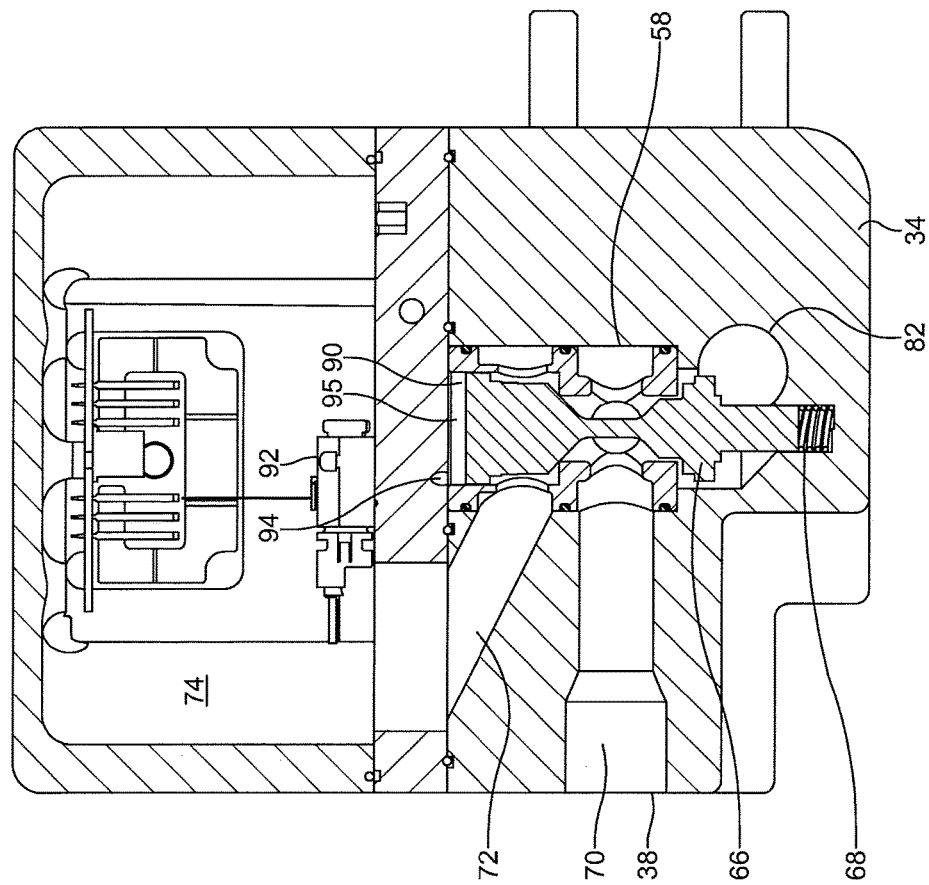
FIG. 3 is a cross-sectional view of a portion of the tire pressure management system of FIG. 1 which depicts another portion of the valve assembly of FIG. 2.
Figure 4:
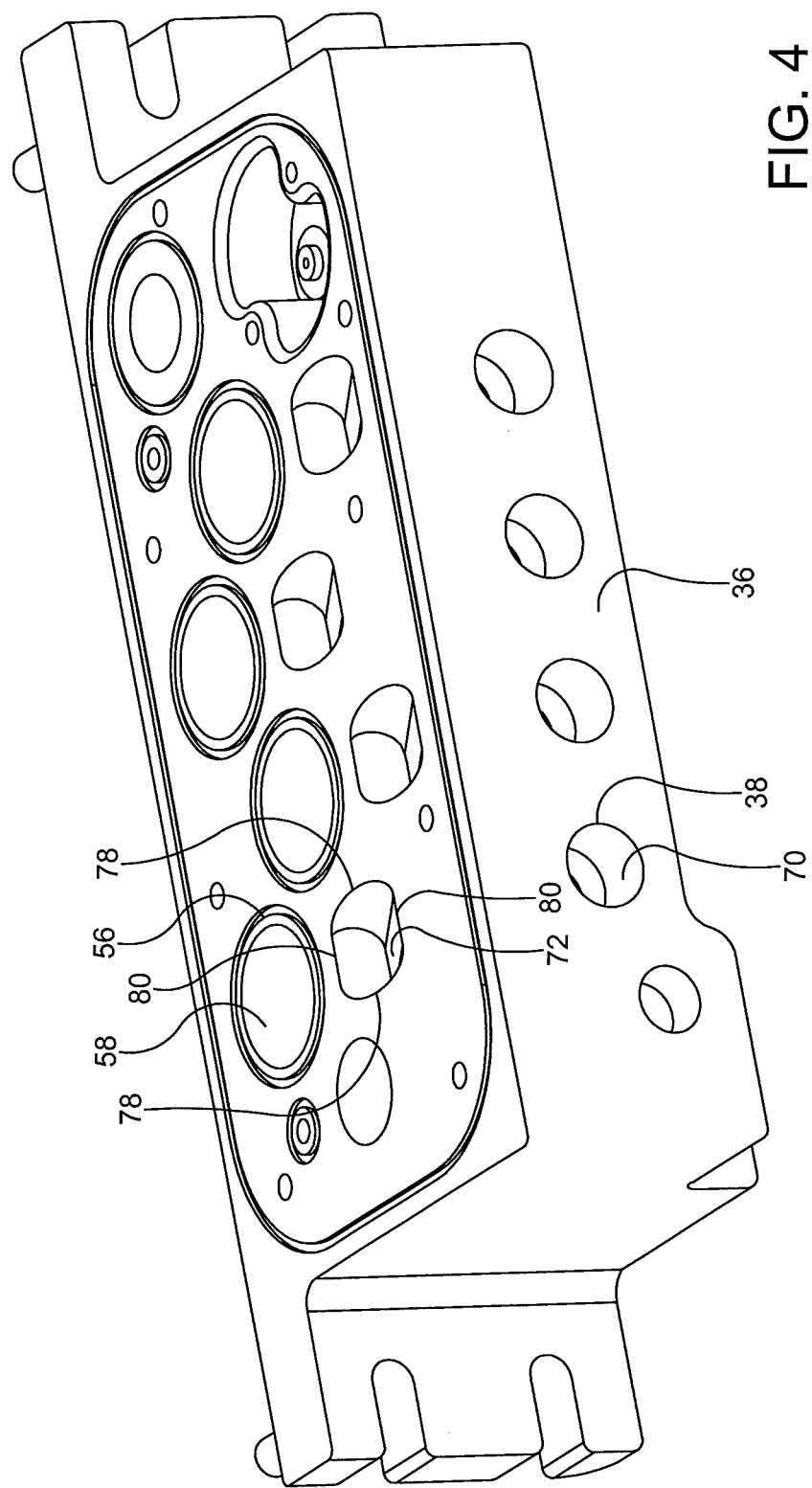
FIG. 4 is a perspective view of a portion of the tire pressure management system of FIG. 1 illustrating certain portions of the valve assembly of FIG. 2 with certain portions of the valve assembly removed for clarity.

The pneumatic control unit 30 comprises a body portion 34, which is best shown in FIGS. 2-4. An air supply port 36 and a channel port 38 are formed in the body portion 34. Preferably, a separate channel port 38, 38A, 38B, 38C is provided for each wheel assembly 12, 12A, 12B, 12C capable of fluid communication with the system 10. The air supply port 36 and the channel port 38 may each include a threaded portion (not depicted) for attaching separate fluid conduits 32, 40 to the pneumatic control unit 30. As illustrated in FIG. 1, the air supply port 36 is attached to the supply fluid conduit 32 and the channel port 38 is attached to a first control circuit fluid conduit 40.

The channel port 38 is in fluid communication with the wheel valve assembly 20 via a fluid control circuit 42. Preferably, each wheel valve assembly 20, 20A, 20B, 20C of the system 10 is in fluid communication with a channel port 38, 38A, 38B, 38C via a fluid control circuit 42, 42A, 42B, 42C provided therebetween. The fluid control circuit 42 comprises the first control circuit fluid conduit 40 which is attached to and in fluid communication with the channel port 38 and a rotary joint 44. The rotating and stationary portions of the fluid control circuit 42 are in fluid communication via the rotary joint 44. Also, the fluid control circuit 42 comprises a second control circuit fluid conduit 46 which is in fluid communication with the rotary joint 44 and the wheel valve assembly 20. In an embodiment, the rotary joint 44 allows the second control circuit fluid conduit 46 to rotate with the wheel assembly 12 and the first control circuit fluid conduit 40 to remain stationary relative to the wheel assembly 12. Preferably, each fluid control circuit 42, 42A, 42B, 42C is similarly configured.

The fluid control circuit 42 is selectively in fluid communication with the wheel assembly 12 via the wheel valve assembly 20. Preferably, the wheel valve assembly 20 is attached to the wheel assembly 12 and is operable between an open position and a closed position for increasing, decreasing or maintaining the tire pressure. Preferably, each wheel valve assembly 20, 20A, 20B, 20C in fluid communication with the system 10 is as described above and attached to a respective wheel assembly 12, 12A, 12B, 12C as illustrated in FIG. 1. Preferred embodiments of the wheel valve assembly 20 are described in published PCT patent application no. WO 2014/028142, the entire disclosure of which is hereby incorporated by reference in its entirety. Preferably, each wheel valve assembly 20, 20A, 20B, 20C is similarly configured.

The wheel valve assembly 20 may be in the closed position or an open position. When a pressure differential between the pressure within the second control circuit fluid conduit 46 and the tire pressure is above an opening threshold, the wheel valve assembly 20 is in or placed in an open position. Preferably, the opening threshold is about 5 psi or more. More preferably, the opening threshold is about 5 to about 8 psi. The wheel valve assembly 20 may be configured to have a specific opening threshold. The wheel valve assembly 20 remains in an open position so long as the pressure differential between the pressure within the second control circuit fluid conduit 46 and the tire pressure is above the opening threshold. When a pressure differential between the tire pressure and the pressure within the second control circuit fluid conduit 46 is above a closing threshold, the wheel valve assembly 20 is in or placed in the closed position. Preferably, the closing threshold is about 5 to about 8 psi. The wheel valve assembly 20 may be configured to be at a specific closing threshold. The wheel valve assembly 20 remains in the closed position until the system 10 determines that the tire pressure needs to be adjusted.

The pneumatic control unit 30 also comprises an inner fluid conduit 48. The inner fluid conduit 48 provides a passageway for directing air through the pneumatic control unit 30. The inner fluid conduit 48 may comprise one or more branches 50, 50A, 50B, 50C, 52. Each branch 50, 50A, 50B, 50C, 52 may selectively be in fluid communication with another portion of the pneumatic control unit 30. When the pneumatic control unit 30 comprises more than one channel port 38, 38A, 38B, 38C, separate valve assemblies 8, 8A, 8B, 8C are provided to allow selective fluid communication between the inner fluid conduit 48 and each channel port. In an embodiment, each branch 50, 50A, 50B, 50C may selectively communicate with a respective channel port 38, 38A, 38B, 38C via a respective valve assembly 8, 8A, 8B, 8C. The valve assemblies 8, 8A, 8B, 8C allow the fluid control circuits 42, 42A, 42B, 42C to be isolated from each other and the inner fluid conduit 48. Thus, if desired, the valve assemblies 8, 8A, 8B, 8C allow the inner fluid conduit 48 to communicate individually with each fluid control circuit 42, 42A, 42B, 42C. Also, the inner fluid conduit 48 is selectively in fluid communication with the supply conduit 32 via the air supply port 36 and an air supply valve assembly 54.

The air supply valve assembly 54 allows for selective fluid communication between the air source 18 and the inner fluid conduit 48. When it is desired to adjust the tire pressure, the air supply valve assembly 54 is in an open position to allow the air source 18 to communicate with the inner fluid conduit 48. The air supply valve assembly 54 is preferably as described in published PCT patent application no. WO 2014/124429. The air supply port 36 is selectively in fluid communication with the channel port 38 via the air supply valve assembly 54, the inner fluid conduit 48 and the valve assembly 8.

Preferably, the valve assembly 8 is of the three-way variety. Referring now to FIGS. 1-4, the valve assembly 8 comprises a housing 56. In an embodiment, the housing 56 is formed from a portion of the body portion 34 of the pneumatic control unit 30. The housing 56 comprises a valve cavity 58. The valve cavity 58 comprises a major cavity portion 60, lower cavity portion 62 and biasing member cavity portion 64. The major cavity portion 60 is attached to the lower cavity portion 62 and an angled transition portion 65 connects the lower cavity portion 62 to the biasing member cavity portion 64. Thus, the major cavity portion 60 is separated from the biasing member cavity portion 64 by the lower cavity portion 62 and the angled transition portion 65. The major cavity portion 60, lower cavity portion 62 and biasing member cavity portion 64 are each of a generally cylindrical shape. Each of the major cavity portion 60, lower cavity portion 62 and biasing member cavity portion 64 has a diameter. The diameter of the major cavity portion 60 is greater than the diameter of the lower cavity portion 62. The diameter of the lower cavity portion 62 is greater than the diameter of the angled transition portion 65 and the diameter of the biasing member cavity portion 64. A piston 66 and a biasing member 68 are disposed within the valve cavity 58.

The valve assembly 8 has a high flow capacity for enabling the tire pressure to be quickly increased or decreased. The valve assembly 8 is in fluid communication with the channel port 38 via a first fluid conduit 70. The first fluid conduit 70 enables fluid communication between the valve assembly 8 and other portions of the tire pressure management system 10 in fluid communication with the channel port 38. From the channel port 38, the first fluid conduit 70 extends through the body portion 34 to the valve cavity 58. The first fluid conduit 70 is in fluid communication with the valve cavity 58. More particularly, on an end thereof, the first fluid conduit 70 is in fluid communication with the major cavity portion 60 of the valve cavity 58.

The valve assembly 8 is also in fluid communication with the atmosphere via a second fluid conduit 72. The first fluid conduit 70 and second fluid conduit 72 are selectively in fluid communication. On an end, the second fluid conduit 72 is in fluid communication with the valve cavity 58. More particularly, on an end thereof, the second fluid conduit 72 is in fluid communication with the major cavity portion 60 of the valve cavity 58. The second fluid conduit 72 extends through the body portion 34. On an opposite end, the second fluid conduit 72 is in fluid communication with the atmosphere via a chamber 74 and a vent port 75 formed in the pneumatic control unit 30. On an end, the vent port 75 is in fluid communication with the chamber 74. On an opposite end, the vent port 75 is in fluid communication with the atmosphere. Thus, the second fluid conduit 72 enables fluid communication between the valve cavity 58 and the atmosphere.

The second fluid conduit 72 extends through the body portion 34 of the pneumatic control unit 30 between the valve cavity 58 and the chamber 74 at an oblique angle relative to the valve cavity 58. Preferably, the second fluid conduit 72 has a generally ovular shape in cross-section. Providing the second fluid conduit 72 with a cross-section which is generally ovular allows the pressurized air flow from and through an upper chamber 76 of the valve assembly 8 to be increased. As the pressurized air flow from and through an upper chamber 76 is increased, the target tire pressure for the wheel assembly 12 can be lowered. However, it should be appreciated that the second fluid conduit 72 could be of another cross-sectional shape. In an embodiment, the second fluid conduit 72 is defined by a pair of rounded wall portions 78 and a pair of planar wall portions 80. Each rounded wall portion 78 is attached to each of the planar wall portions 80 and the planar wall portions 80 are in a parallel relationship with each other.

The valve assembly 8 is selectively in fluid communication with the air source 18 via a third fluid conduit 82. The first fluid conduit 70 and third fluid conduit 82 are selectively in fluid communication. The third fluid conduit 82 extends through the body portion 34 of the pneumatic control unit 30 and is in fluid communication with the valve cavity 58 on an end. More particularly, on an end thereof, the third fluid conduit 82 is in fluid communication with the lower cavity portion 62 of the valve cavity 58. On an opposite end, the third fluid conduit 82 is in fluid communication with a branch 50 of the inner fluid conduit 48 to enable fluid communication between the valve cavity 58 and the air source 18.

The piston 66 comprises an upper portion 84, middle portion 86 and a lower portion 88. The middle portion 86 is attached to the upper portion 84 and the lower portion 88 and separates the upper portion 84 from the lower portion 88. The upper portion 84 has an end surface 90. The end surface 90 forms a first end of the piston 66. The end surface is configured to receive a pneumatic signal of pressurized air from a solenoid valve 92. To provide a pneumatic signal of pressurized air, the solenoid valve 92 is in fluid communication with the inner fluid conduit 48 via a fluid conduit (not depicted). The solenoid valve 92 is also in fluid communication with the valve cavity 58 via a pneumatic signal conduit 94. The pneumatic signal conduit 94 is in fluid communication with the valve cavity 58 and, more particularly, a space 95 in the major cavity portion 60 above the piston 66.

The pneumatic control unit 30 also comprises a pressure transducer 150. The pressure transducer 150 measures the tire pressure, measures the pressure of the air from the air source 18, dynamically measures a pressure of the air in the inner fluid conduit 48 and provides signals related thereto. The pressure transducer 150 is in fluid communication with the inner fluid conduit 48 via a port formed in the body portion 34.

Portions of the pneumatic control unit 30 are in communication with a control device 152. When the tire pressure is being increased or decreased, the pressure transducer 150 may dynamically measure the pressure of the air in the inner fluid conduit 48 and provide a signal to the control device 152 which corresponds to the tire pressure. The control device 152 receives a signal from the pressure transducer 150 and may provide a signal to the air supply valve assembly 54, valve assembly 8 and a deflate valve assembly 154. The control device 152 may also be in communication with the pressure transducer 150 for reading and displaying the tire pressure.

The signal provided by the control device 152 is in the form of an electrical current and when sent to the valve assembly 8 is received by the solenoid valve 92. In response to the signal provided by the control device 152, the solenoid valve 92 is energized and provides a pneumatic signal to the piston 66. Energizing the solenoid valve 92 enables fluid communication between the inner fluid conduit 48 and the space 95 above the piston 66 via the fluid conduit and the pneumatic signal conduit 94. As the pneumatic signal conduit 94 is in fluid communication with the space 95 above the piston 66, pressurized air from the inner fluid conduit 48 can be directed to the end surface 90 of the piston 66 when a signal provided by the control device 152 is received by the solenoid valve 92. The piston 66 is moveable in response to the pneumatic signal directed to its end surface 90.

For describing the system provided herein, when an electrical current is received by the solenoid valve 92, the valve assembly 8 may be referred to as being "open." When no electrical current is received by the solenoid valve 92 or when electrical current is removed from the solenoid valve 92, the valve assembly 8 may be referred to as being "closed."

When the valve assembly 8 is open as is shown in FIG. 3, the inner fluid conduit 48 is in fluid communication with the fluid control circuit 42 via fluid communication between the first fluid conduit 70 and the third fluid conduit 82 of the valve assembly 8 and the channel port 38. Also, under these conditions, the inner fluid conduit 48 is in fluid communication with the wheel valve assembly 20 via the fluid control circuit 42. When the valve assembly 8 is closed as is shown in FIG. 2, the fluid control circuit 42 is not in fluid communication with the inner fluid conduit 48. Instead, under these conditions, the fluid control circuit 42 is vented to the atmosphere via fluid communication between the first fluid conduit 70 and the second fluid conduit 72 of the valve assembly 8 as described below. Also, when the valve assembly 8 is closed, the wheel valve assembly 20 is moved into a closed position due to the difference in pressure between the tire pressure and the atmosphere. Closing the wheel valve assembly 20 prevents pressurized air from being added to or being removed from the wheel assembly 12. Advantageously, utilizing the valve assembly 8 described herein, allows the wheel valve assembly 20 to be closed quickly and under low tire pressure conditions. Each valve assembly 8, 8A, 8B, 8C provided can be opened or closed as described above to permit or prevent fluid communication between the inner fluid conduit 48 and a selected fluid control circuit 42, 42A, 42B, 42C and to close a respective wheel valve assembly 20, 20A, 20B, 20C.

The end surface 90 of the piston 66 is provided as a portion of the upper portion 84 of the piston 66 and is attached to a first annular portion 96. The first annular portion 96 has an outer diameter 98. The first annular portion 96 is attached to a first cylindrical portion 100. The first cylindrical portion 100 has an outer diameter 102 which is less than the outer diameter 98 of the first annular portion 96. The first cylindrical portion 100 is attached to a first frusto-conical portion 104. The first frusto-conical portion 104 is attached to the first cylindrical portion 100 on an end and the middle portion 86 on an opposite end. The middle portion 86 is of a generally cylindrical shape. The middle portion 86 is attached to a second frusto-conical portion 106, which is provided as a portion of the lower portion 88 of the piston 66. The second frusto-conical portion 106 is attached to a second cylindrical portion 108. The second cylindrical portion 108 has an outer diameter 110. The second cylindrical portion 108 is attached to a second annular portion 112. The second annular portion 112 has an outer diameter 114 which is greater than the outer diameter 110 of the second cylindrical portion 108.

The second annular portion 112 is attached to a stem portion 116. The stem portion 116 extends from the second annular portion 112 into the biasing member cavity portion 64 of the valve cavity 58. In an embodiment, the stem portion is of a cylindrical shape. A second end of the piston 66 is defined by an end surface 118 of the stem portion 116. The second end of the piston 66 is provided opposite the first end of the piston 66.

The stem portion extends down into the biasing member cavity portion 64 of the valve cavity 58. In the biasing member cavity portion 64, the end surface 118 of the stem portion 116 is contacted by the biasing member 68. The end surface 118 of the stem portion 116 is configured to be contacted by the biasing member 68 to urge the piston 66 away from the biasing member cavity portion 64 and an end 120 of the valve cavity 58. In an embodiment, the end surface 118 has a circular shape. As best illustrated in FIGS. 2-3, the biasing member 68 is provided in the biasing member cavity portion 64 and an end thereof contacts the stem portion 116 to provide a bias to the piston 66. On another end, the biasing member contacts a portion of the body portion 34 of the pneumatic control unit 30. Disposing the biasing member 68 in the biasing member cavity portion 64 allows the pressurized air flow through the upper chamber 76 to the atmosphere to be increased because the biasing member 68 is not provided in the flow pathway of the pressurized air. Increasing the flow of pressurized air through the upper chamber 76 to the atmosphere allows the target tire pressure for the wheel assembly 12 to be lowered. The biasing member 68 is formed from a resilient material such as, for example, spring steel. Preferably, the biasing member 68 is a coil spring.

The piston 66 is at least partially disposed within a cage member 122. The cage member also functions as a guide and the piston 66 is movable in a linear fashion therein. Portions of the piston 66 are sealingly engaged with portions of the cage member 122 to allow pressurized air to flow through the valve assembly 8 to other portions of the tire pressure management system 10. The cage member 122 and the biasing member 68 are in a spaced apart relationship. In an embodiment, the cage member 122 and the biasing member 68 are separated from each other by a portion of the piston 66. More particularly and as best illustrated in FIGS. 2-3 and 5, the cage member 122 and the biasing member 68 are separated from each other by the stem portion 116.

As illustrated in FIGS. 2-3, the cage member 122 is positioned within the valve cavity 58. More particularly, the cage member 122 is positioned within the major cavity portion 60 of the valve cavity 58. The cage member 122 and the biasing member 68 are also separated from each other by the lower cavity portion 62 of the valve cavity 58. As will be described below, the cage member 122 is in a sealed relationship with the housing 56.

Figure 5:
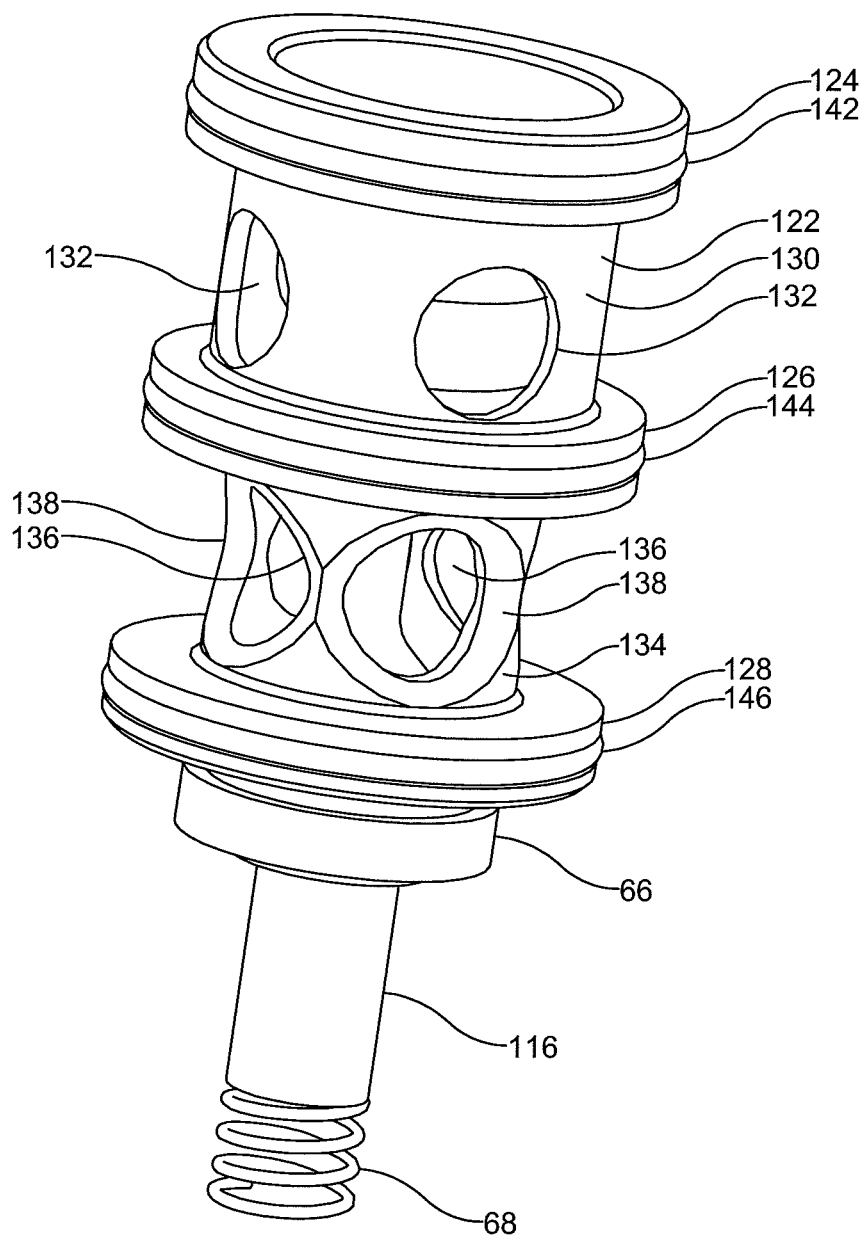
FIG. 5 is a perspective view of certain portions of the valve assembly of FIG. 2.

Referring now to FIG. 5, the cage member 122 comprises an upper annular portion 124, middle annular portion 126 and lower annular portion 128. The upper annular portion 124 is disposed around the first annular portion 96 of the piston 66. The upper annular portion 124 is attached to the middle annular portion 126 via a first wall portion 130. The first wall portion 130 is of a cylindrical shape and has a plurality of circular shaped holes 132 provided therethrough. The first wall portion 130 is disposed around the first cylindrical portion 100 of the piston 66. The middle annular portion 126 is attached to the lower annular portion 128 via a second wall portion 134. The second wall portion 134 is of a cylindrical shape and has a plurality of holes 136 provided therethrough. At least one hole of the plurality of holes 136 formed through the second wall portion 134 is at least partially defined by a filleted portion 138. Preferably, each hole of the plurality of holes 136 is at least partially defined by a filleted portion 138 of the second wall portion 134. Defining the holes 136 utilizing filleted portions 138 improves the flow of pressurized air through the valve assembly 8 and venting of the fluid control circuit 42, which further allows the wheel valve assembly 20 to close under low tire pressure conditions. Referring back to FIG. 2, the filleted portions 138 allow for greater pressurized air flow through a middle chamber 140 of the valve assembly 8. Allowing for greater pressurized air flow through a middle chamber 140 of the valve assembly 8, further allows the target tire pressure for the wheel assembly 12 to be lowered. The second wall portion 134 is disposed around the middle portion 86 of the piston 66.

Referring back to FIG. 5, a sealing member 142, 144, 146 is provided around each of the upper annular portion 124, middle annular portion 126 and lower annular portion 128. Preferably, each sealing member 142, 144, 146 is disposed in a groove and ring-shaped. Preferably, each sealing member 142, 144, 146 is formed from an elastomeric material. In an embodiment, each sealing member 142, 144, 146 is an O-ring. The sealing members 142, 144, 146 provide separate seals between the upper annular portion 124, middle annular portion 126 and lower annular portion 128 and the housing 56 which allows the cage member 122 to be in a sealed relationship with the housing 56.

Referring back to FIG. 2, the valve assembly 8 also comprises the upper chamber 76, the middle chamber 140 and a lower chamber 148. The upper chamber 76 is in fluid communication with the chamber 74 via the second fluid conduit 72. The upper chamber 76 is also selectively in fluid communication with the middle chamber 140. The upper chamber 76 is in fluid communication with the middle chamber 140 when, for example, it is desired to vent the fluid control circuit 42.

When it is desired to vent the fluid control circuit 42, the solenoid valve 92 is de-energized. When the solenoid valve 92 is de-energized, a pneumatic signal is not directed to the end surface 90 of the piston 66 and the biasing member 68 provides a bias to the piston which urges the piston 66 away from the biasing member cavity portion 64 and the end 120 of the valve cavity 58. Under these conditions, the first fluid conduit 70 is in fluid communication with the second fluid conduit 72 via the upper chamber 76 and the middle chamber 140. As the upper chamber 76 and second fluid conduit 72 are in fluid communication with atmosphere via the chamber 74 and the vent port 75 and the middle chamber 140 is in fluid communication with the fluid control circuit 42 via the channel port 38 and first fluid conduit 70, once the upper chamber 76 is in fluid communication with the middle chamber 140 pressurized air can flow from the fluid control circuit 42 through the valve assembly 8 and the second fluid conduit 72 to the chamber 74. From the chamber 74, the pressurized air is vented to the atmosphere via the vent port 75. When the fluid control circuit 42 is being vented to the atmosphere, a portion of the second frusto-conical portion 106 of the piston 66 is sealingly engaged with an inner portion of the lower annular portion 128 as is shown in FIG. 2.

Also, when it is desired to vent the tire pressure management system 10, it is preferred that the tire pressure management system 10 is vented as described in published PCT patent application no. WO 2014/124429. When it is desired to vent the tire pressure management system 10, the deflate valve assembly 154 is open which allows the inner fluid conduit 48 to communicate with the atmosphere via a variable area valve assembly 156. The deflate valve assembly 154, variable area valve assembly 156 and a fluid conduit 158 provided therebetween are preferably as described in published PCT patent application no. WO 2014/124429.

When it is desired to increase, decrease or maintain the tire pressure, the middle chamber 140 is placed into fluid communication with the lower chamber 148. To place the middle chamber 140 into fluid communication with the lower chamber 148, the solenoid valve 92 is energized and a pneumatic signal is directed to the end surface 90 of the piston 66 as described above. Also, as noted above, the piston is moveable in response to the pneumatic signal provided by energizing the solenoid valve 92. When a pneumatic signal is received by the end surface 90 of the piston 66, the piston is urged toward the biasing member cavity portion 64 and the end 120 of the valve cavity 58 and compresses the biasing member 68.

Under these conditions, the first fluid conduit 70 is in fluid communication with the third fluid conduit 82 via the middle chamber 140 and the lower chamber 148. As the lower chamber 148 can be in fluid communication with the air source 18 via the supply conduit 32, air supply valve assembly 54, the inner fluid conduit 48 and the third fluid conduit 82 and the middle chamber 140 is in fluid communication with the fluid control circuit 42 via the channel port 38 and first fluid conduit 70, once the lower chamber 148 is in fluid communication with the middle chamber 140 pressurized air can be directed from the inner fluid conduit 48 to the fluid control circuit 42 via the valve assembly 8 to increase, decrease or maintain the tire pressure when desired. When pressurized air is being directed to the fluid control circuit 42 to increase, decrease or maintain the tire pressure, a portion of the first frusto-conical portion 104 of the piston 66 is sealingly engaged with an inner portion of the middle annular portion 126 as is shown in FIG. 3.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A valve assembly for a tire pressure management system, comprising:
    a housing which comprises a valve cavity;
    a cage member positioned within the valve cavity, the cage member in a sealed relationship with the housing;
    a piston moveable within the cage member; and
    a biasing member provided in a biasing member cavity portion of the valve cavity, the biasing member contacts an end of a stem portion of the piston to urge the piston away from the biasing member cavity portion, wherein the end of the stem portion is positioned in the biasing member cavity and the biasing member is not provided in a flow pathway of pressurized air through the valve assembly.

2. The valve assembly according to claim 1, wherein the valve cavity also comprises a major cavity portion and the cage member is positioned in the major cavity portion.

3. The valve assembly according to claim 2, wherein and the major cavity portion is separated from the biasing member cavity portion by a lower cavity portion.

4. The valve assembly according to claim 1, wherein biasing member contacts a circular end surface of the stem portion to urge the piston away from the biasing member cavity portion.

5. The valve assembly according to claim 1, wherein the biasing member and the cage member are separated from each other by a portion of the piston.

6. The valve assembly according to claim 1, wherein the cage member comprises an upper annular portion attached to a middle annular portion via a first cylindrically-shaped wall portion and a lower annular portion attached to the middle annular portion via a second cylindrically-shaped wall portion, wherein the first cylindrically-shaped wall portion includes a plurality of holes formed therethrough and the second cylindrically-shaped wall portion includes a plurality of holes formed therethrough, at least one hole of the plurality of holes formed through the second cylindrically-shaped wall portion being at least partially defined by a filleted portion of the second cylindrically-shaped wall portion.

7. The valve assembly according to claim 1, wherein the piston also comprises an upper portion and the upper portion has an end surface which is configured to receive a pneumatic signal and form a first end of the piston, the first end of the piston being provided opposite a second end of the piston, wherein the second end of the piston is defined by an end surface of the stem portion.

8. The valve assembly according to claim 7, wherein the pneumatic signal is provided by energizing a solenoid valve.

9. The valve assembly according to claim 7, wherein the stem portion is provided as a portion of a lower portion of the piston, wherein the lower portion is attached to a middle portion and the middle portion separates the lower portion and the upper portion.

10. The valve assembly according to claim 1, wherein a first fluid conduit is in fluid communication with the valve cavity and another portion of the tire pressure management system and a second fluid conduit is in fluid communication with the valve cavity and selectively in fluid communication with the first fluid conduit.

11. The valve assembly according to claim 10, wherein the second fluid conduit has a generally ovular shape in cross-section.

12. The valve assembly according to claim 10, wherein the second fluid conduit is defined by a pair of rounded wall portions.

13. The valve assembly according to claim 10, wherein the first fluid conduit and the second fluid conduit are each in fluid communication with a major cavity portion of the valve cavity.

14. The valve assembly according to claim 10, wherein the another portion of the tire pressure management system is a port formed in a pneumatic control unit.

15. The valve assembly according to claim 10, wherein the second fluid conduit is also in fluid communication with atmosphere via a chamber formed in a pneumatic control unit.

16. The valve assembly according to claim 10, further comprising a third fluid conduit in fluid communication with a lower cavity portion of the valve cavity.

17. The valve assembly according to claim 1, further comprising a pneumatic signal conduit in fluid communication with the piston and the piston being moveable in response to a pneumatic signal directed to the piston through the pneumatic signal conduit.

18. A valve assembly for a tire pressure management system, comprising:
a housing which comprises a valve cavity, a first fluid conduit in fluid communication with the valve cavity and another portion of the tire pressure management system, a second fluid conduit in fluid communication with the valve cavity and selectively in fluid communication with the first fluid conduit, and a third fluid conduit in fluid communication with the valve cavity and selectively in fluid communication with the first fluid conduit;
a cage member positioned within the valve cavity, the cage member in a sealed relationship with the housing; and
a piston moveable within the cage member, the piston comprises a first end surface and a second end surface, the first end surface and the second end surface define opposite ends of the piston, wherein the first end surface is configured to receive a pneumatic signal and the second end surface is configured to be contacted by a biasing member to urge the piston away from an end of the valve cavity, and when the pneumatic signal is not received by the first end surface the first fluid conduit is in fluid communication with the second fluid conduit which allows pressurized air to flow from the first fluid conduit to the second fluid conduit, the biasing member not being within a flow pathway of the pressurized air from the first fluid conduit to the second fluid conduit.

19. The valve assembly according to claim 18, wherein the cage member comprises an upper annular portion attached to a middle annular portion via a first cylindrically-shaped wall portion and a lower annular portion attached to the middle annular portion via a second cylindrically-shaped wall portion, wherein the first cylindrically-shaped wall portion includes a plurality of holes formed therethrough and the second cylindrically-shaped wall portion includes a plurality of holes formed therethrough, at least one hole of the plurality of holes formed through the second cylindrically-shaped wall portion being at least partially defined by a filleted portion of the second cylindrically-shaped wall portion.

20. The valve assembly according to claim 18, wherein the second fluid conduit is defined by a pair of rounded wall portions and has a generally ovular shape in cross-section.

* * * * *